Feb. 19, 1946. H. FLEISHER ET AL Re. 22,722

SCREEN COLOR PRINTING APPARATUS

Original Filed Sept. 6, 1941 5 Sheets-Sheet 1

INVENTORS
Harry Fleisher.
George H. Tillett.
BY H. G. Manning
ATTORNEY

Feb. 19, 1946. H. FLEISHER ET AL Re. 22,722

SCREEN COLOR PRINTING APPARATUS

Original Filed Sept. 6, 1941 5 Sheets-Sheet 2

INVENTORS
Harry Fleisher.
George H. Tillett.
BY H. G. Manning
ATTORNEY

Feb. 19, 1946. H. FLEISHER ET AL Re. 22,722

SCREEN COLOR PRINTING APPARATUS

Original Filed Sept. 6, 1941 5 Sheets-Sheet 3

INVENTORS
Harry Fleisher.
George H. Tillett.
BY
H. G. Manning
ATTORNEY.

Feb. 19, 1946. H. FLEISHER ET AL Re. 22,722

SCREEN COLOR PRINTING APPARATUS

Original Filed Sept. 6, 1941 5 Sheets-Sheet 4

INVENTORS
Harry Fleisher.
George H. Tillett.
BY H. G. Manning
ATTORNEY

Feb. 19, 1946. H. FLEISHER ET AL Re. 22,722

SCREEN COLOR PRINTING APPARATUS

Original Filed Sept. 6, 1941 5 Sheets-Sheet 5

INVENTORS
Harry Fleisher.
George H. Tillett.
BY H. G. Manning
ATTORNEY

Reissued Feb. 19, 1946

Re. 22,722

UNITED STATES PATENT OFFICE 22,722

SCREEN COLOR PRINTING APPARATUS

Harry Fleisher, Watertown, Conn., and George H. Tillett, New York, N. Y., assignors to Roto-Matic Screen Printer, Ltd., New York, N. Y., a corporation of New York Original No. 2,321,134, dated June 8, 1943, Serial No. 409,866, September 6, 1941. Application for reissue June 6, 1944, Serial No. 538,894

14 Claims. (Cl. 101—126)

This invention relates to apparatus for applying designs upon flexible webs of textile fabrics, paper, and like materials, and more particularly to an improved apparatus employing a stencil-printing screen.

This invention is an improvement over a screen printing apparatus disclosed in a prior Patent No. 2,210,474, issued August 6, 1940, to George H. Tillett, entitled "Color printing web."

This application is a continuation of our prior application, Ser. No. 364,604, filed November 7, 1940, entitled "Screen printing apparatus."

One object of this invention is to provide an improved form of of color squeegee for spreading the color paste upon and through the stencil screen and means to support the same out of contact with said screen at the rear end of its stroke.

A further object of this invention is to provide an improved apparatus for applying designs upon flexible webs of the above nature, which will be relatively inexpensive to manufacture, simple in construction, easy to operate by relatively unskilled labor, compact, ornamental in appearance, and very efficient and durable in use.

With these and other objects in view, which will appear as the description proceeds, there have been illustrated in the accompanying drawings several forms in which the invention may be conveniently embodied in practice.

Briefly, the screen printing apparatus of this invention includes a central table for supporting a screen frame and a pair of spools, one carrying a roll of web to be printed, and the other serving as a take-up roll for the web after printing. The web to be printed is adhesively fixed to a carrier belt which is fed manually intermittently from one spool below the screen to be wound upon the other spool.

Provision is also made of marginal spacer strips secured to the carrier belt so that when said belt is wound in spiral condition, the color paste freshly printed upon the web will be kept out of contact with the adjacent layer of said web, whereby smudging of said color will be prevented, and said fresh color will be given a chance to dry. The spacer strips also serve to separate the successive layers of the web and provide between them a draining space through which a stream of dry air may be forced.

By winding the printed web in spiral form upon the take-up spools, the material may be stored while drying or curing in the minimum of space as compared to the former methods of drying printed webs on elongated flat tables or suspending said webs in festoons or loops.

In the drawings:

Figure 8 is a sectional view of a modified form of the invention having a spring-pressed adjustable spool flange.

Figure 9 is an end view of the same.

Figure 1:
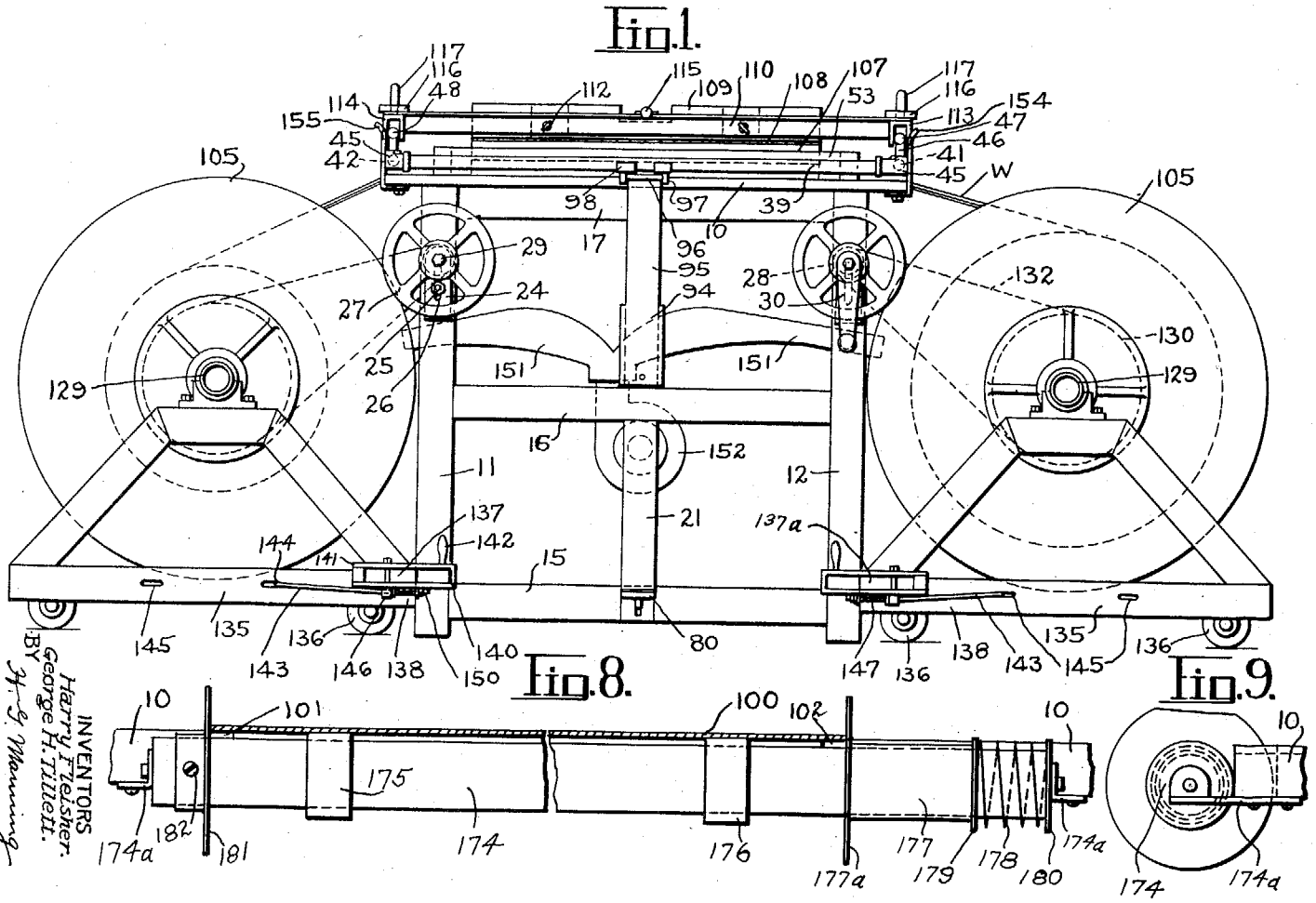
Figure 1 is a front elevational view of an improved screen printing apparatus embodying the invention.

Referring now to the drawings wherein like reference numerals designate like parts throughout the several views, the numeral 10 denotes a flat table top which, in this instance, is suitably supported by four corner uprights, or legs 11, 12, 13, and 14. The uprights 11 and 12 are connected and braced by horizontal bars 15, 16, and 17, while the uprights 13 and 14 are likewise connected and braced by similar horizontal bars located behind said bars 15, 16, and 17, and concealed thereby as viewed in Figure 1. The front uprights 12 and 13 are connected and braced at the top by horizontal side bars 18, 19, and 20, and the uprights 11 and 14 are braced by similar side bars concealed thereby. At each end of the apparatus, provision is made of upright bars 21 extending from the lower horizontal bar 15 to the upper bar 17, and a short vertical bar 22 extends at each side from the intermediate horizontal bar 19 to the lower bar 20 (Figure 2).

Provision is also made of a pair of horizontal shafts 23 mounted in and extending between the uprights 11 and 12, and the uprights 14 and 13, respectively. Each of said shafts 23 is journaled at each upright 11, 12, 14, and 13, in brackets 24 (Figures 1 and 2), each of which is vertically adjustable in and is secured to the respective upright by a bolt 25 passing through an elongated slot 26 provided in the bracket 24 and screw-threaded into the respective upright. A hand wheel 27 is secured on the front end of each shaft 23 and a sprocket 28 is secured on the rear end of said shaft. The shafts 23 are extended at their front ends 29 beyond the uprights 12 and 13, and said ends are preferably made hexagonal in cross-section to removably receive a manually-operated crank handle 30.

Figure 2:
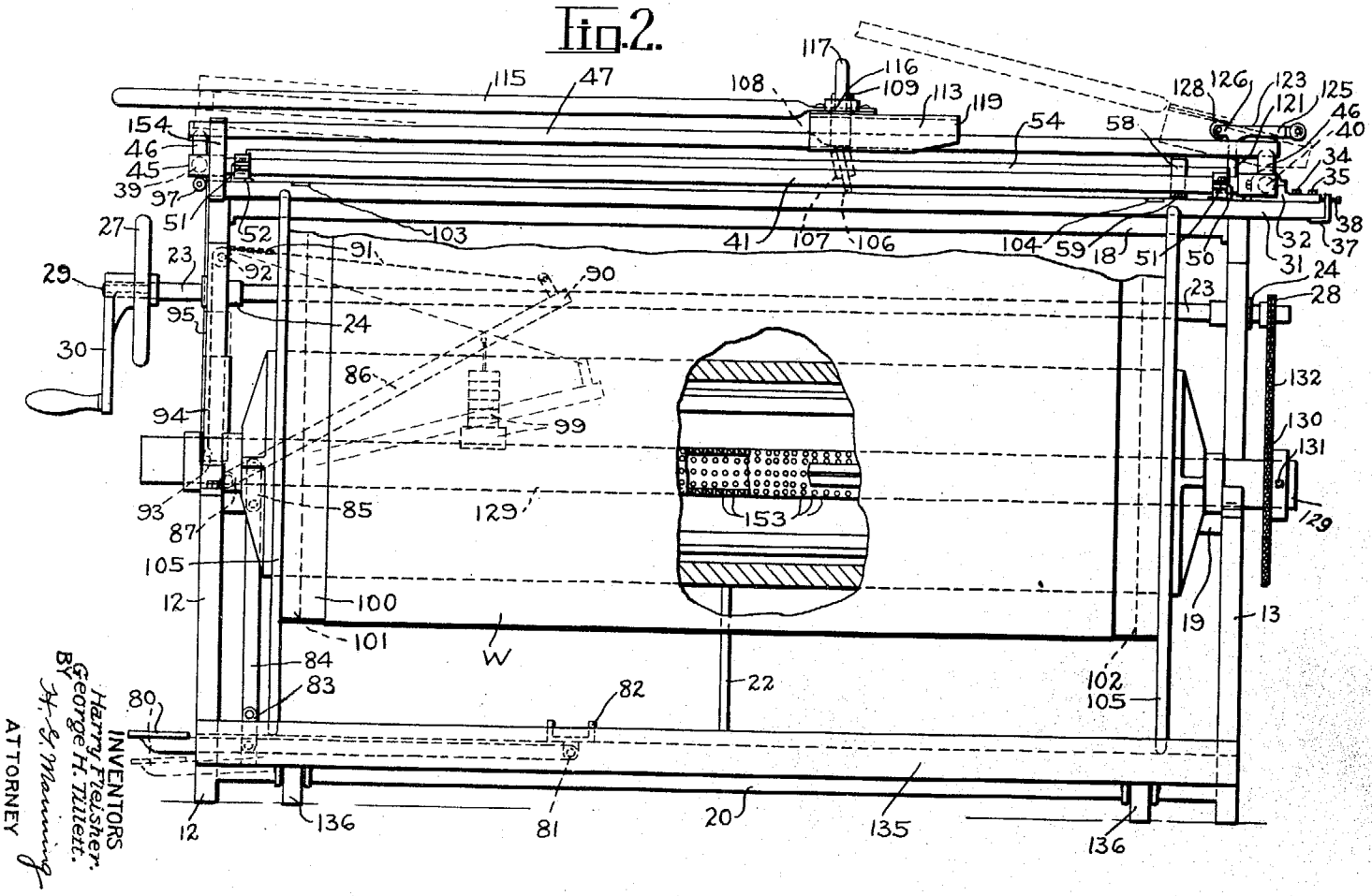
Figure 2 is a broken end elevational view of the same.
Figure 3:
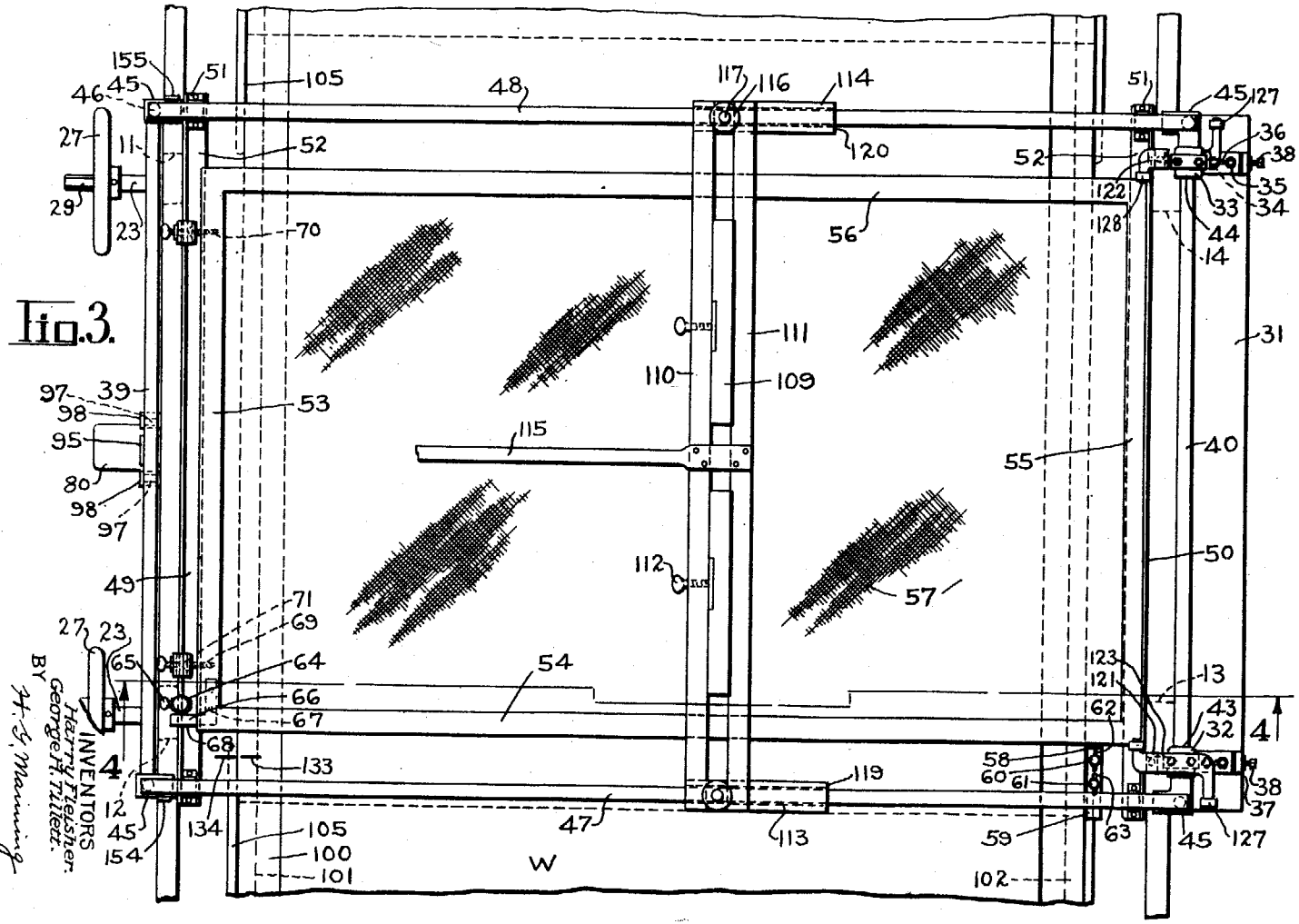
Figure 3 is a top plan view of the same.

The table top 10 extends rearwardly beyond the corner uprights 11 and 14, as at 31, and is provided with a pair of transversely-spaced apart bearing brackets 32 and 33 adjustably mounted thereon by means of bolts 34 and 35 passing through a common elongated slot 36 in each bracket and through the table top extension 31 (Figures 2 and 3). An angle piece 37 secured to the table top extension 31 has a screw 38 threaded therethrough into engagement with each of the brackets 32 and 33 to permit them to be held in any desired position and to prevent said brackets from moving rearwardly when the machine is being operated.

*Stencil screen*

Provision is also made of a swingable stencil-supporting frame (Figures 1 to 5), comprising end rods 39 and 40, and side bars 41 and 42, the rear end rod 40 being pivoted in bearings 43 and 44 carried by the brackets 32 and 33 respectively. The rods 39, 40, 41, and 42 are connected together at the corners of the stencil frame by four angle blocks 45, thus maintaining the frame in rectangular shape.

Four vertically disposed posts 46 extend upwardly—one from each angle block 45—to support side rods or tracks, 47 and 48, which are spaced above the side rods 41 and 42 respectively, and are parallel thereto. An elongated angle bar 49 extends between the side rods 41 and 42 adjacent the front end of the screen-supporting frame, and a similar angle bar 50 extends between the rods 41 and 42 adjacent the rear ends thereof. The angle bars 49 and 50 are adjustably secured to the respective rods 41 and 42 by clamping brackets 51, and are arranged to have one of their angle portions horizontal and the other vertical. By means of the brackets 51, the angle bars 49 and 50 may be adjusted longitudinally in the direction of web travel along the rods 41 and 42 to position the stencil frame supported thereby in the desired location.

The horizontal base portions 52 of the angle bars 49 and 50 extend toward each other and form opposing seats for a rectangular stencil screen, which, in this instance, is made of four narrow wooden strips 53, 54, 55, and 56, and secured together at their adjoining ends. A printing stencil sheet 57 is stretched across the bottom of the stencil screen, said sheet 57 being preferably made of specially treated silk having the desired perforated design formed thereon through which the thin color paste may penetrate and be applied by a squeegee to the web W placed thereunder. In this instance, the front and rear strips 53 and 55 of the stencil screen are removably seated on the horizontal portions 52 of the angle bars 49 and 50 of the swingable stencil screen supporting frame.

The stencil frame, comprising the strips 53, 54, 55, and 56, is seated in the carrying frame, comprising the bars 39, 40, 41, and 42, and may be brought into exact register with the design on the stencil screen by adjustment of the vertical limit arm 58 (see Figures 2 and 3), of an adjustable guide bar having a horizontal arm 59 which is secured to the table top 10 by bolts 60 and 61 which pass through elongated slots 62 and 63 respectively, provided in the horizontal arm 59, and which bolts are screw-threaded into the table top 10. The stencil frame is definitely located at its front end by a slidable block 64, adapted to be clamped adjustably to the angle bar 49 by a thumb screw 65, and an angle strip 66, secured to the stencil frame strip 53 by screws 67, one arm 68 of said angle strip being adapted to engage the block 64.

Figure 4:
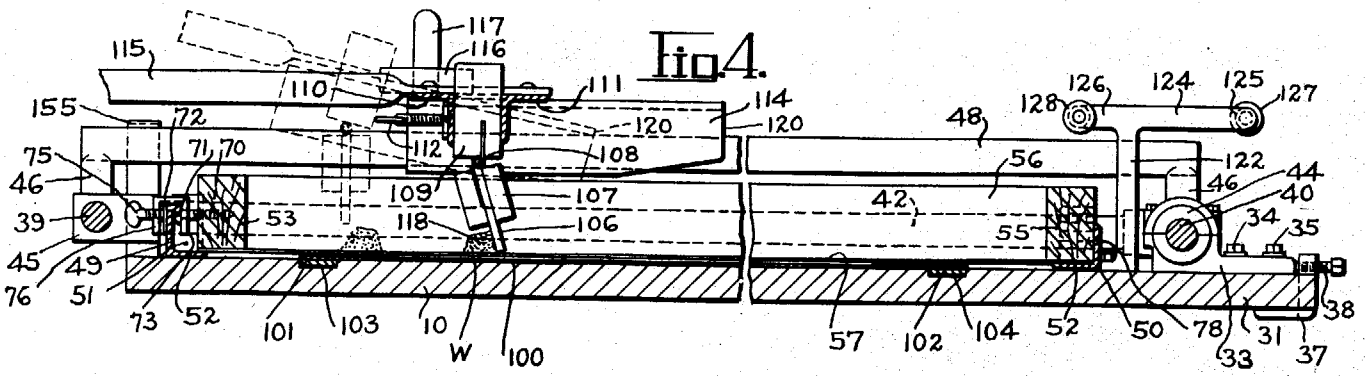
Figure 4 is an enlarged broken horizontal view of the upper part of the machine taken on the line 4—4 of Figure 3.

Lengthwise adjustment of the stencil frame is obtained by the use of a pair of transversely spaced apart wood screws 69 and 70 (see Figures 3 and 4). The wood screws 69 and 70 are screw-threaded into the front stencil frame strip 53 and have heads 71 which are spaced forwardly therefrom.

The screws 69 and 70 are each engaged by an inverted U-shaped clamping block 72 having the rear leg 73 thereof provided with a slot 74 extending upwardly from its lower edge and adapted to embrace the respective screw 69, 70 therein with the screw head 71. A thumb screw 75 is screw-threaded through the front leg 76 of the U-shaped block 72 and engages a loose clamp plate 77 for engaging the vertical portion of the angle bar 49 to securely clamp the front stencil frame strip 53 thereto. By manually rotating the screws 69 and 70 by means of a suitable tool, such as a screw driver, before clamping them to the bar 49, by the block 72, adjustment of the stencil frame may be made to compensate for any possible warping thereof. The rear strip 55 of the stencil frame may be detachably secured to the angle bar 50 in any suitable manner, but is herein shown as being merely seated therein (Figures 4 and 5), with its rear edge abutting the vertical portion 78 of said angle bar 50.

By means of the above structure, it will be seen that the stencil frame is adjustable transversely and lengthwise upon its carrying frame and that variations in width of different stencil frames may be compensated for by adjustment of the vertical limit arm 58 and the adjustable block 64. Variations in the length of different stencil frames is compensated for either by means of the adjustable angle bars 49 and 50, or the wood screws 69 and 70, or both.

The stencil screen 53, 54, 55, and 56, may be manually lifted from the underlying web W whenever it is desired to shift the web, by swinging its carrying frames 39, 40, 41, and 42 upwardly about the hinged connection of the rod 40 in the bearings 43 and 44 as a pivot.

Provision is also made of means to manually lift the stencil screen carrying frame 39, 40, 41, and 42, and such means comprises a pivoted foot treadle 80 which, as shown in Figure 2, is connected to the front rod 39 of the screen carrying frame through a system of links and levers arranged with a "mechanical disadvantage" whereby a comparatively small movement of the treadle 80 will move said frame a relatively large amount.

The foot treadle 80 is pivoted at 81 to a cross bar 82 extending between the lower side bars 20, and provision is made of a short upstanding link 83, which loosely connects the forward part of the treadle 80 with a long vertical link 84. The upper end of the long link 84 is loosely connected to a short vertical link 85, which in turn is pivoted to an inclined arm 86 at a point closely adjacent the lower fixed end 87 thereof. The end 87 of the arm 86 is pivoted to the front intermediate upright 21 between a pair of angle blocks, and the upper end 90 of the arm 86 is connected by a chain, 91 (see Figure 2), reeved over a pulley 92, supported on the rear surface of the upright 21, said chain passing downwardly from said pulley and being connected to a post 93 secured to a vertical slide 94, which is adapted to loosely embrace the upright 21.

The slide 94 is connected to the lower end of an upstanding plate 95 (Figures 2 and 3), which carries a short horizontal shaft 96 at its upper end. The shaft 96 extends beyond the sides of the plate 95 and has rollers 97 journaled on each end thereof. The rollers 97 engage blocks 98 secured to the underside of the front screen frame rod 39 and serve to reduce friction. By means of this construction, it will be seen that, when the operator steps on the treadle 80, force will be transmitted through the links 83, 84, 85, arm 86, chain 91, slide 94, plate 95, to the rollers 97, causing the front end of the stencil screen carrying frame to swing upwardly and lift the stencil screen out of contact with the web W. To assist the operator in this operation, counterweights 99 may be hung upon the arm 86 adjacent its upper end 90. The stencil carrying frame is engaged at its forward end by a pair of curved strips 154 and 155 (see Figures 1 and 3) which serve to guide the angle blocks 45 as this frame is lowered into place.

The web W is adapted to be fed across the table top 10 under the stencil screen 57 from one side of the printing apparatus to the other. In order to avoid any stretching or movement of the web W, it is temporarily secured upon a carrier band, or belt, 100, preferably constructed of heavy flexible paper, by means of a non-drying, sticky adhesive which may be composed, for example, of a mixture of china clay and glycerine. By the use of this adhesive, the carrier belt 100, may be used repeatedly before replacement is necessary, due to the fact that it may be stripped therefrom repeatedly without damage to the belt 100 or the web W. In most instances only the outer fibres at the undersurface of the web W are impregnated by the adhesive.

Figure 5:
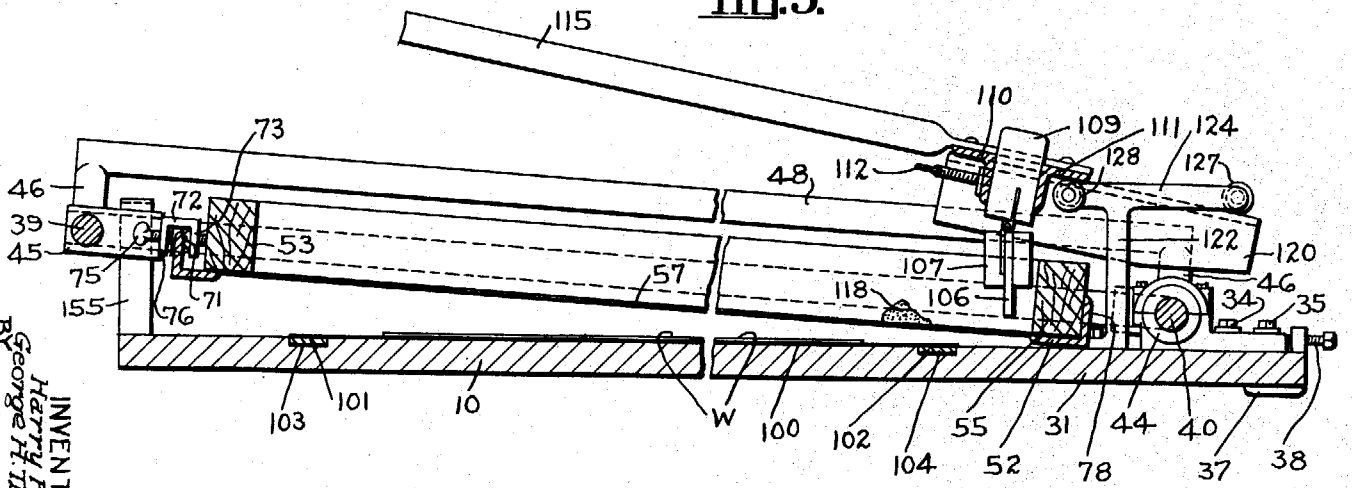
Figure 5 is a view similar to Figure 4, but showing the stencil screen with one end raised from the web to be printed, and with the squeegee also raised and supported out of operative position.
Figure 6:
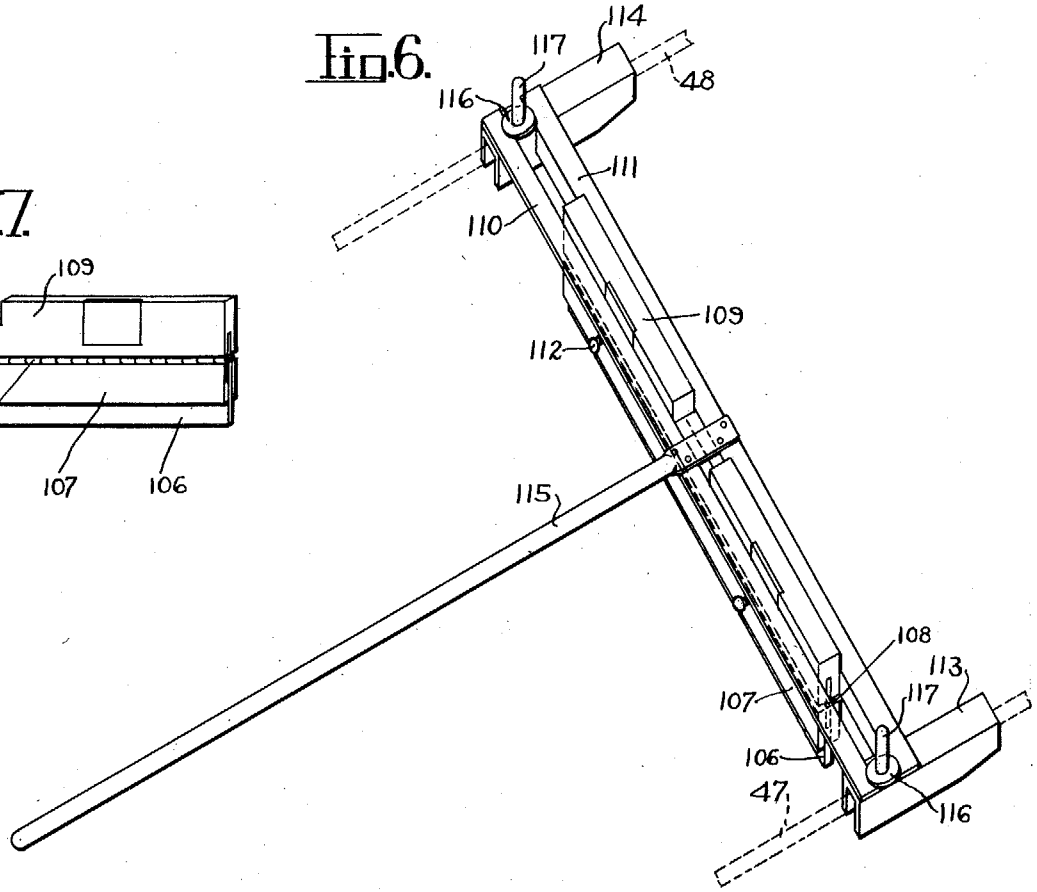
Figure 6 is a perspective view of the squeegee and its holding and operating frame.
Figure 7:
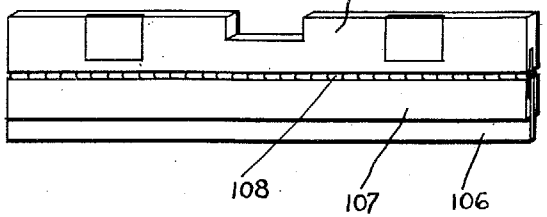
Figure 7 is a perspective view of the squeegee shown by itself.

Provision is also made of a pair of spacer strips 101 and 102 disposed beneath both margins of the carrier belt 100, and preferably cemented thereto. It will be understood that said strips 101 and 102 may, if desired, be riveted to the carrier belt 100 as by eyelets, within the scope of the invention. The combined web W, carrier belt 100, and spacer strips 101 and 102, are adapted to be guided across the table top 10, by means of a pair of transverse grooves 103 and 104, respectively, formed in the upper surface of said table top 10 (Figures 4 and 5). When the web W and the carrier strip 100 are wound into a spiral coil upon a spool 105 (as shown in Figures 1 and 2), it will be understood that the belt 100 will be spaced apart in successive layers by the strips 101 and 102 at its edges, thus providing an air space therebetween, protecting the color paste printed on the web W and preventing "smudging" of the table top 10 thereby. The color will thus be permitted to penetrate uniformly into the web and produce a sharp and distinct reproduction of the design thereon. The edges of the web carrier belt 100 outside the web are preferably coated with shellac or other suitable material to seal them against moisture and afford additional stiffening.

The color paste employed in the screen printing apparatus is adapted to be forced through perforations in the stencil screen 57 onto and into the web W by means of a squeegee blade 106 (Figures 2, 4, and 5), preferably made of soft rubber and having its upper edge set into a recessed strip 107. The strip 107 is hinged as at 108 to another strip 109, located above it, which strip 109 is adapted to be clamped between a pair of transverse angle bars 110 and 111 by a pair of thumb screws 112. The angle bars 110 and 111 are secured to the forward ends of a pair of short horizontal slide members 113 and 114 of inverted U-shape in cross-section. The legs of each inverted U-shaped member straddle the parallel side tracks 47 and 48 and thus guide the squeegee blade 106 in its manual reciprocation by the operator who grasps a relatively long handle rod 115 secured at one end to the cross bars 110 and 111, as shown in Figures 1, 2, 3, 4 and 5. It will be noted that the inverted U-shaped guiding members 113 and 114 do not actually rest on the tracks 47 and 48, but the weight of this structure and the squeegee blade 106 is imposed directly upon the stencil screen 57 so as to cause the color paste to pass therethrough and upon the web beneath it. The pressure of the squeegee blade 106 upon the screen may be increased if desired by the use of suitable ring shaped weights 116 surrounding a pair of vertical posts 117 extending upwardly from the guide members 114.

In operation, the squeegee blade 106 will be lifted at each end of its stroke and moved and lowered at the opposite side of the mass of color paste so as to push it in the reverse direction. This operation is readily accomplished by swinging the handle rod 115 upwardly and causing the rear ends 119 and 120 of the guide members 113 and 114 to engage the tracks 47 and 48 which act as fulcrums therefor.

When the printing operation is completed, the squeegee blade 106 will be raised away from the stencil screen 57 and maintained in such raised position, while the stencil screen is also lifted and the web shifted to bring a new unprinted portion into registry with the screen. For this purpose, provision is made of a pair of transversely spaced apart standards 121 and 122 (see Figure 3), secured to the table top 10 to the rear of the stencil screen supporting angle bar 50 (see Figures 3, 4, and 5). Each of the standards 121 and 122 has a horizontal rearwardly extending arm 123, 124, and a forwardly extending angle arm 125, 126, respectively. The arms 123 and 124 extend outwardly in opposite directions and carry rollers 127, and the arms 125 and 126 extend inwardly toward each other and carry rollers 128 (see Figures 2, 3, 4, and 5).

When it is desired to support the squeegee blade 106 up out of contact with the stencil screen 57 at the rear end of its stroke, it will merely be necessary to tilt the handle 115 upwardly to cause the rear ends 119 and 120 of the guide members 113 and 114 to be disposed under the rollers 127, and the rear cross bar 111 to be disposed above the rollers 128 (as shown in Figure 5). The web-carrying belt with the web W adhering thereto may then be fed across the table top 10 from the feed spool 105 on one side of the printing apparatus to the take-up spool 105 on the other side. Each of the spools 105 has a hollow shaft 129 which extends from its rear end, and has a sprocket 130 detachably secured to said extending end by a set screw 131. A chain, 132, is reeved over the sprocket 130 and the sprocket 28 on the hand wheel shafts 23 whereby rotation of the hand wheel 27 on the take-up side of the apparatus will cause the web W to be fed across the table top 10 from the feed spool 105.

In order to insure accurate printing, indicating lines 133 are marked at spaced intervals along the edge of the carrier belt 100, and a single line 134 is marked on the table top 10. These marks when in alignment indicate to the operator that the web W has been properly positioned in accurate registration for another printing operation.

*Spools*

As herein shown, a pair of identical spools 105, are provided which may be selectively used for "feeding" and "taking-up" of the web. Each spool is permanently mounted upon a truck 135 having casters 136 whereby it may be wheeled toward and away from the apparatus to carry the web into and out of printing position. In order to insure accurate registration of the printed designs on the web, means are herein provided on each side of the printing apparatus for alining the spool carrying truck 135 with said apparatus. The positioning means above referred to includes two pairs of resilient arms 137, 137*a* extending outwardly from the corner uprights 12, 13, and 11, 14. The arms 137, 137*a* are each curved outwardly to facilitate the movement of the side base bars 138 and 139 of the truck 135 into engagement therewith and to guide the feeding spool so that the web W to be printed will be in correct transverse registry with the stencil screen when it is fed into printing position.

In order to lock the spool truck 135 in operating position, provision is made on each of said positioning means of a toggle mechanism comprising a lever 140 having one end pivoted as at 141 to the adjacent resilient arm 137, 137*a*. A handle 142 at the other end of the lever 140 is provided to manipulate the same. Provision is also made of a thin rod 143 having a hooked end 144 adapted to catch into an elongated slot 145 provided in the side base bars 138 and 139 and pivotally secured to the lever 140 intermediate its ends, said rod 143 passing through a vertical post 146 which is arranged to rotate in the lever 140. A coiled spring 147 surrounds the rod 143 and reacts between the post 146 and a washer held on the outer end of the rod 143 by lock nuts 149 and 150. When it is desired to hold the truck in locked position, the hooked end 144 of the rod 143 will be connected to the truck side bars 138 and 139 by engagement in the slot 145 nearest thereto and the levers 140 will be swung into the truck-locking position. If desired, an additional slot 145 may be used so that the trucks may be readily reversed and either side thereof selectively applied to the printing apparatus.

*Web-drying apparatus*

While the apparatus is being operated, and a freshly printed web W is being wound continually upon the take-up spool 105, a constant flow of dry air will be directed against the surface of the web on said spool by means of a duct 151 leading from a central motor driven air blower 152 (see Figure 1). Additional drying may also be obtained by means of an auxiliary blower, not shown, to force dry air into the hollow spool shaft 129, which air will be caused to flow outwardly through perforations 153 therein and between the layers of the spiral coil of web W wound thereon.

In the modified form of the invention shown in Figures 8 and 9, a cross rod 174 is secured to the table 10 by a pair of brackets 174*a*, 174*a*. The cross rod 174 is provided with a pair of spaced collars 175 and 176 for supporting the interior of the carrier belt 100 as it passes from the spool to the top of the table 10.

Provision is also made of an adjustable flanged guide sleeve 177 having a large flange 177*a* which is mounted to slide on one end of said cross rod 174 and is pressed inwardly at all times by a coiled spring 178 reacting between a pair of small flanges 179, 180 formed on said sleeve 177 and said cross rod 174, respectively An adjustable flanged sleeve 181 is mounted on the opposite end of the cross rod 174 and may be held in any desired position by a set screw 182.

The above construction will be used when the spacer strips are not secured to the carrier belt, or should become accidentally separated therefrom.

*Operation*

The operation of the above described screen printing apparatus is substantially in accordance with that disclosed in the above-mentioned Patent No. 2,210,474. In brief, the operation is as follows:

Assuming the squeegee blades 106 is held in raised position by the rollers 127 and 128 (see Figure 5), the stencil screen frame will be swung upwardly by depressing the treadle 80. The web-carrying belt 100 will be drawn across the table top 10 from the feeding spool 105 with the spacer strips 101 and 102 guided by the grooves 103 and 104, respectively. The free end of the web-carrying belt 100 will then be attached to a take-up roll 105, which has first been blocked in place at the other side of the printing apparatus, by threading it through the slot 172 in a longitudinal bar 173 of the take-up spool. The hand wheels 27 will then be turned to bring the first mark 133 on the carrier belt into alignment with the mark 134 on the table top 10, whereupon the stencil screen holding frame will be lowered to cause said screen to engage the web W. The squeegee blade 106 will then be lowered upon the rear end of the stencil screen 57 and the proper quantity of color paste will then be placed upon the screen 57 in front of the blade 106, which may then be pulled forwardly by means of the handle 115.

When the squeegee blade 106 is in its forward position after having traversed the length of the screen 57, it will be lifted by tilting the handle 115 upwardly and placed in front of the mass of color paste, and then pushed rearwardly to spread the same along the screen 57. After the desired number of strokes of the squeegee blade 106 have been made, said blade will be latched in its raised position as above described. The stencil carrying frame will be swung upwardly by means of the treadle 80. The web W will then be fed along the desired amount to bring the next desired indicating mark 133 on the web-carrying belt into registry with the mark 134 on the table top 10. This procedure will be continued until the web has been completely unrolled from the feed spool, and wound up on the take-up spool.

After the spool of unstenciled web has been unwound from the feeding spool, printed, and wound up on the take-up spool, the latter may be unlocked and rolled away from the printing apparatus for drying or other treatment. It will then be returned to the printing apparatus on either side thereof, if desired, and the previous take-up roll will then serve as the feed roll—it being merely necessary to shift the crank handle 30 to the other shaft 23 to operate the feeding mechanism and take-up mechanism, as described above.

While there has been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In an apparatus for printing color repeats upon a web, a supporting bed for said web, a swingable stencil-screen-carrying frame pivoted to one side of said bed, a vertically slidable plate having anti-friction means located beneath the free end of said frame, a foot operated treadle, a chain connected to said plate, and passing around a pulley connection to a lever, and linkage means to connect said lever to said treadle, whereby depression of the latter will raise said frame to carry said stencil frame upwardly and permit said web to be advanced thereunder to its next printing position.

2. In an apparatus for printing color repeats upon a web, a bed to support said web while being printed, a stencil-screen-carrying frame mounted on said bed, means to intermittently raise said frame out of printing position, a queegee mounted to slide and pivot on said frame, a flexible mounting for said squeegee, an elongated handle connected to said squeegee mounting, a plurality of members carried by said mounting and extending away from said handle, and a pair of spaced arms located above said bed to engage under one of said members and over another member to latch said squeegee up out of contact with said screen.

3. In an apparatus for printing color repeats upon a web, a bed to support said web while being printed, a stencil-screen-carrying frame mounted on said bed, means to intermittently raise said frame out of printing position, a squeegee mounted to lide and pivot on said frame, a flexible mounting for said squeegee, an elongated handle connected to said squeegee mounting, a plurality of members carried by said mounting and extending away from said handle, and a pair of spaced oppositely extending arms located above said bed to engage under one of said members and over another member to latch said squeegee up out of contact with said screen.

4. In an apparatus for printing color repeats upon a web, a bed to support said web while being printed, a stencil-screen-carrying frame mounted on said bed, means to intermittently raise said frame out of printing position, a squeegee mounted to slide and pivot on said frame, a flexible mounting for said squeegee, an elongated handle connected to said squeegee mounting, a plurality of members carried by said mounting and extending away from said handle, and a pair of spaced roller-carrying-arms located above said bed to engage under one of said members and over another member to latch said squeegee up out of contact with said screen.

5. In an apparatus for printing color repeats upon a web, a bed to support said web while being printed, a stencil-screen-carrying frame mounted on said bed, means to intermittently raise said frame out of printing position, a squeegee mounted to slide and pivot on said frame, an elongated handle for said squeegee, a plurality of members movable with said handle and extending away therefrom, and a pair of spaced arms located above said bed to engage under one of said members and over another member for latching said squeegee up out of contact with said screen.

6. In an apparatus for printing color repeats upon a web, a bed to support said web while being printed, a stencil-screen-carrying frame mounted on said bed, means to intermittently raise said frame out of printing position, a squeegee mounted to slide and pivot on said frame, an elongated handle for said squeegee, a plurality of members movable with said handle and extending away therefrom, and a pair of spaced oppositely extending arms located above said bed to engage under one of said members and over another member for latching said squeegee up out of contact with said screen.

7. In an apparatus for printing color repeats upon a web, a bed to support said web while being printed, a stencil-screen-carrying frame mounted on said bed, means to intermittently raise said frame out of printing position, a squeegee mounted to slide and pivot on said frame, an elongated handle for said squeegee, a plurality of members movable with said handle and extending away therefrom, and a pair of spaced roller-carrying arms located above said bed to engage under one of said members and over another member for latching said squeegee up out of contact with said screen.

8. In an apparatus for printing color repeats upon a web, a bed to support said web while being printed, a stencil-screen-carrying frame mounted on said bed, means to intermittently raise said frame out of printing position, a squeegee mounted to slide and pivot on said frame, a plurality of members movable with said squeegee, and a pair of spaced arms located above said bed to engage under one of said members and over another member for latching said squeegee up out of contact with said screen.

9. In an apparatus for printing color repeats upon a web, a bed to support said web while being printed, a stencil-screen-carrying frame mounted on said bed, means to intermittently raise said frame out of printing position, a squeegee mounted to slidably reciprocate and pivot on said frame, a plurality of members movable with said squeegee, and a pair of elements which engage under one of said members and over another member for latching said squeegee up out of contact with said screen when said squeegee is tilted and slid near one end of its stroke.

10. In an apparatus for printing color repeats upon a web, a bed to support said web while being printed, a stencil-screen-carrying frame mounted on said bed, means to intermittently raise said frame out of printing position, a squeegee mounted to slide and pivot on said frame, a pair of spaced elements, and means movable with said squeegee to engage under one of said elements and over said other element for latching said squeegee up out of contact with said screen.

11. In an apparatus for printing color repeats on a web, the combination of means to support said web during printing, a stencil screen, a stencil-screen-carrying frame, means to mount said frame for movement relative to said web supporting means, means to move said frame to and away from printing position, a squeegee blade, a blade carrying member, means to pivotally mount said member for reciprocable movement across said web, a pair of spaced elements, and means movable with said squeegee to engage under one of said elements and over the other element for latching said squeegee up out of contact with said screen when said squeegee is tilted and slid near one end of its stroke.

12. In an apparatus for printing color repeats on a web, the combination of means to support said web during printing, a stencil screen, a stencil-screen-carrying frame, means to mount said frame for movement relative to said web supporting means, means to move said screen and frame to and away from said printing position, a squeegee blade, a blade carrying member, means to mount said member on said frame for constrained movement across said web, and means to latch said member and squeegee out of the path of movement of said screen and frame when said squeegee is out of use and when said screen and frame are to be moved away from printing position.

13. In an apparatus for printing color repeats upon a web, the combination of means to support said web during printing, a stencil screen, a stencil-screen-carrying frame, means to mount said frame for movement relative to said web supporting means, means to move said screen and frame to and away from printing position, a squeegee blade, a blade carrying member, means to mount said member on said frame for constrained movement across said web with the blade in the frame and for free downward movement, whereby the full weight of said member presses said blade against the screen, and means to maintain said member and squeegee out of the path of movement of said screen and frame when said squeegee is out of use, when said screen and frame are to be moved away from printing position.

14. In an apparatus for printing color repeats upon a web, the combination of means to support said web during printing, a stencil frame, a stencil-screen-carrying frame, means to mount said frame for movement relative to said web supporting means, means to move said screen and frame to and away from printing position, a squeegee blade, a blade carrying member, a second member, means to connect said members for relative limited swingable movement, means to mount said second member on said frame for constrained movement across said web and for free downward movement, whereby the full weight of said members presses said blade against the screen, and means to maintain said member and squeegee out of the path of movement of said screen and frame when said squeegee is out of use and said screen and frame are to be moved away from printing position.

HARRY FLEISHER.
GEORGE H. TILLETT.